March 17, 1964 R. E. NOVKOV 3,124,866
ADJUSTABLE CHIP BREAKER
Original Filed March 9, 1960 2 Sheets-Sheet 1
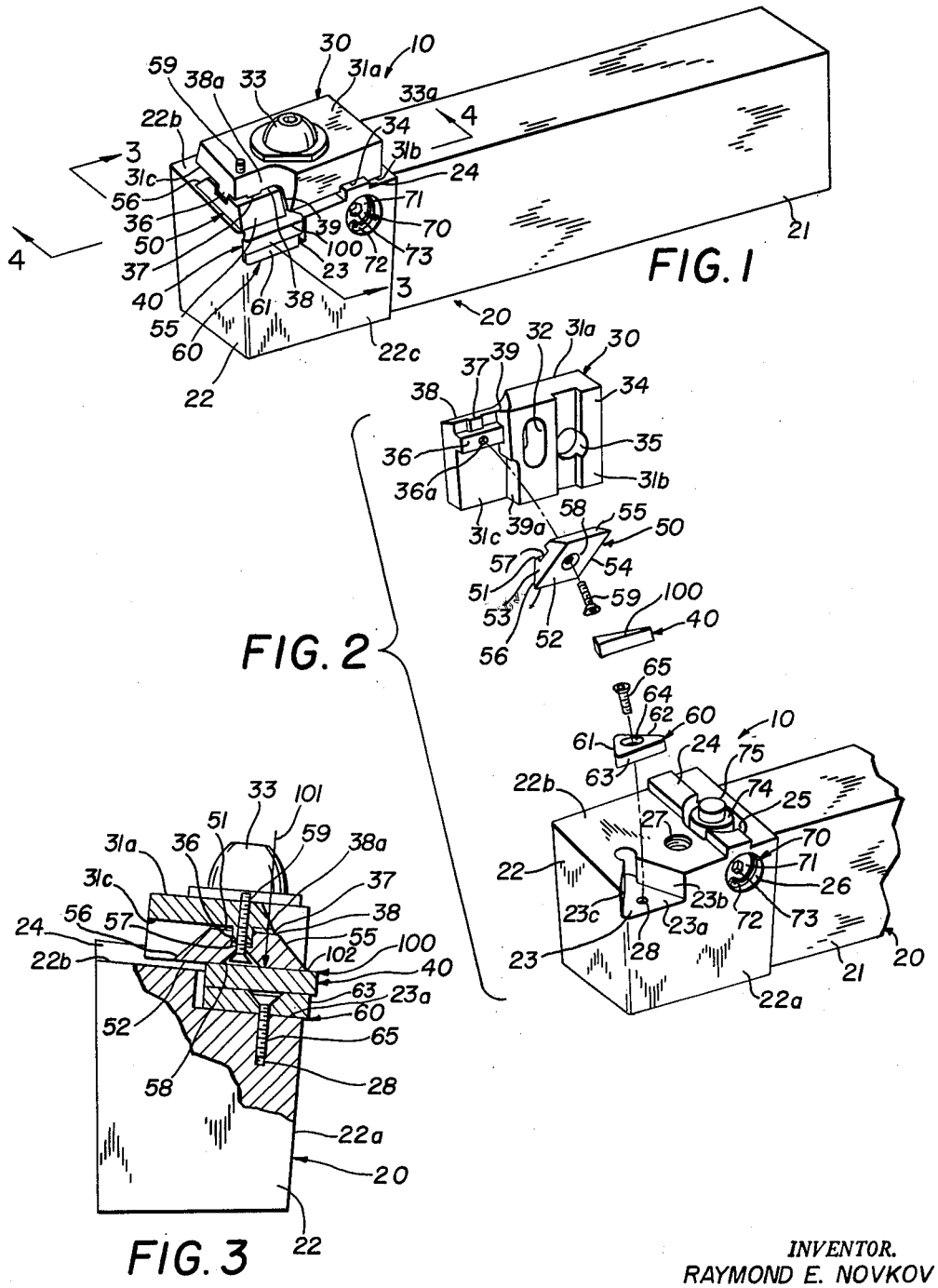
INVENTOR.
RAYMOND E. NOVKOV
BY
ATTORNEY March 17, 1964  R. E. NOVKOV  3,124,866
ADJUSTABLE CHIP BREAKER
Original Filed March 9, 1960  2 Sheets-Sheet 2

INVENTOR.
RAYMOND E. NOVKOV
BY
ATTORNEY

United States Patent Office 3,124,866
Patented Mar. 17, 1964

3,124,866
ADJUSTABLE CHIP BREAKER
Raymond E. Novkov, 1730 17th St.,
Cuyahoga Falls, Ohio
Continuation of application Ser. No. 13,740, Mar. 9,
1960. This application Nov. 8, 1962, Ser. No. 237,435
5 Claims. (Cl. 29—96)

This invention relates to the art of metal working tools, and in particular has reference to improvements in adjustments in adjustable chip breaker elements that are normally associated with such tools for the purposes of facilitating chip removal.

In the prior art of cutting tools of this type, it has long been known that the chip that is cut from a revolving piece of stock, for example, can be controlled as to size and length by use of a chip breaker. Normally, chip breakers of this type include a wear surface that is set slightly behind the cutting edge of the tool and inclined upwardly and rearwardly therefrom so that the chip occurring during the cut is, in effect, rolled into a spiral or other form.

It has been found in the art of chip breaking that the preferred form of chip will resemble a figure 9 so as to have one complete curl provided in the same before breaking off.

In the normal cutting operation, attainment of this desired result is effectuated by a cut and dry method wherein the spacing and/or angular inclination of the chip breaker with respect to the cutting edge is adjusted until the desired result is obtained.

While this can be achieved as above described, it is believed manifest that the same is, at best, time consuming and further does not provide any basis for adjusting the chip breaker during cutting to compensate for localized regions where the hardness of the stock material may vary.

In the prior art, when it is desired to change the position of the chip breaker it has been necessary without exception to stop the machine and reset the chip breaker, with this normally being accomplished by loosening the screws that retain the same in place, followed by repositioning of the device so as to cause a different type of chip to be created.

Oftentimes several resetting attempts are necessary before the desired chip is obtained.

In the copending application of Raymond E. Novkov, Serial Number 688,306, filed October 4, 1957, and now U.S. Patent 2,961,743 there was provided a cutting tool that obviated the majority of the above described disadvantages.

Specifically, the cutting tool of this just referred to copending application featured a chip breaking element that was rotatable with respect to the cutting tool and the tool holder supporting the same, with adjustment means, carried by the body, being capable of effectuating movement of the chip breaker toward and from the cutting edge of the cutting tool during operation.

In copending application, Serial Number 736,361, filed May 19, 1958, and now U.S. Patent 2,937,432 by Raymond E. Novkov, an improved form of adjustment mechanism was substituted in a tool of this type, with similar results being obtained. Additionally, in this application the movement of the chip breaker toward and from the cutting edge was linear instead of rotational, as set forth in the original application.

In the copending application of Raymond E. Novkov, Serial Number 766,120, filed October 8, 1958, and now U.S. Patent 2,967,345 improvements were disclosed for enhancing the over-all life of the chip breaker element itself, with the improvements being directed principally to the insertable type of wear surface in the chip breaker element and to the guiding mechanism employed to guide the chip breaker element during its movement relatively of the tool holder.

While the above referred to copending application is satisfactory in most respects, it has been found that the same are, nonetheless, possessed with certain limitations as follows:

First, it will be noted that there is an absence in the above referred to copending application of any teaching that specifically emphasizes the criticality of the area wherein the clamping pressure is applied on the insert bit. In this regard, it will be noted that in all cases the clamping member overlies both the pocket within which the insert is received and the top surface of the holder that is disposed rearwardly of said pocket. In some instances, and due to the inaccuracies in the insert bits, it has oftentimes been discovered that the majority of clamping pressure will be directed against the tool holder, with only minimal clamping pressure being applied against the insert received in the pocket. It is believed apparent that this would result in an unsatisfactory performance due to the fact that the insert bit that effectuates the cutting would not be securely retained in place during such cutting.

While the above disadvantage is principally encountered with respect to the structures of copending applications, Serial Numbers 688,306 and 736,361, it has been found that the problem is emphasized when a separate chip breaker element is associated with the clamping member as set forth in copending application, Serial Number 766,120. Specifically, and with regard to this structure, it has been found that the problem of directing the clamping pressure onto the insert bit is even more critical.

In this regard, and in view of the fact that the replaceable chip breaker insert overlies both the cutting insert bit and the top of the holder, it has been found that it is manditory that the pressure applied by the clamping member properly be directed onto the insert bit. In the event that such precautions are not observed, it has been found that disadvantages will result. Specifically, if the chip breaker element is positioned so that the same is spaced from the top of the surface of the tool holder in overlying relationship therewith, it has been found that a clamping force applied to the chip breaker in the just described region will operate, in fact, to break the chip breaker insert, much in the manner of a stick being broken over the knee of a person. This is true because the frontal region of the chip breaker insert is, in effect, clamped between the clamping member and the insert cutting bit, with the result that application of force to the unclamped rearward portion thereof will operate to break the insert as just described.

While the localizing of clamping pressure in the frontal region of the cutting insert is desired for the reasons just described, it is also advantageous to effectuate this clamping in the region just described for the reason that it insures contact between the front portions of the chip breaker insert and the cutting insert, with this contact preventing the introduction of chips between these surfaces, which would result in clogging of the tool.

As a second disadvantage of the above referred to copending application and particularly the device of copending application, Serial Number 766,120, it has been found that the chip breaker insert may be improved by (1) permitting the same to be in "floating" engagement with the clamping member and (2) providing more substantial means for effectuating such floating connection, while still permitting the chip breaker insert to absorb the maximum amount of cutting force during use.

It has been found that both of the above disadvantages can be achieved by providing a rib and groove type of connection between the clamping member and the chip breaker insert so that the cutting forces applied normal to the cutting edge of the chip breaker will be absorbed more effectively by the rib and groove connection.

It has been further found that if a loose type of countersunk threaded connection is provided between the clamping member and chip breaker insert that the chip breaker will in effect, be enabled to "float" so as to effectively clamp inserts of varying thickness with equal facility.

The remaining disadvantage of the above discussed copending applications relates to improvements in the bit support members that have been employed in connection with these devices. In all instances, while a bit support has been provided, no means have been disclosed for attaching the same with respect to the tool holder.

While the obvious problems of loss during changing arises by virtue of such construction, it has been found that an even more important disadvantage arises in view of the fact that shifting of the clamping member and chip breaker insert relatively of the holder oftentimes results in forward displacement of the cutting bit and the support bit for the same, with the result that the support bit is oftentimes shifted into a position of only partial support for the cutting insert, and in such instances the application of cutting pressures in the supported areas will oftentimes result in fracturing of the cutting insert. In some instances, it has been observed that the shifting will occur to such an extent that the support bit is, in fact, projecting further beyond the tool holder and the cutting insert.

It has been accordingly discovered that if the bit support member is releasably associated with the pocket for the same in the tool holder, that the disadvantages will be obviated.

Production of an improved adjustable chip breaker having the above advantages accordingly becomes the principal object of this invention, with other objects becoming more apparent upon a reading of the following brief specification, considered and interpreted in the light of the accompanying drawings.

Of the drawings:

FIGURE 1 is a perspective view of the improved chip breaker.

FIGURE 2 is an exploded perspective view showing the component parts in greater detail.

FIG. 3 is a vertical section taken on the lines 3—3 of FIGURE 1.

Figure 4:
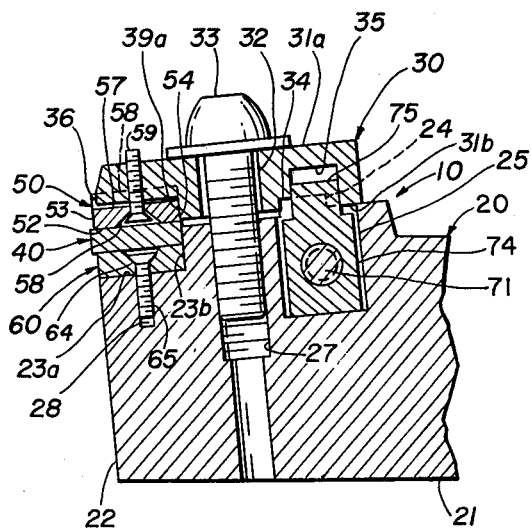
FIGURE 4 is a vertical section taken on the lines 4—4 of FIGURE 1.

Referring now to the drawings and, in particular, to FIGURE 1, the improved chip breaker, generally designated by the numeral 10, includes a tool holder 20, having a clamping member 30 movably associated therewith so as to clamp a cutting bit 40 between the chip breaker 50 and a bit support 60, with the clamping member 30 and chip breaker 50 being movable as a unit relatively of the tool holder 20, cutting insert 40 and bit support 60, by adjustment means 70 that are carried by the tool holder.

Referring first to FIGURES 1 and 2 for a detailed description of the tool holder 20, it will be noted that the same includes a shank portion 21 and a head portion 22, with the head portion 22 being contoured to define a front surface 22a and a top surface 22b.

As best shown in FIGURE 2, these just described front and top surfaces 22a and 22b are provided with a pocket 23 that opens into both such surfaces and that includes a bottom wall 23a and divergent side walls 23b and 23c, with the just described wall sections coacting to form the pocket 23 within which the bit support 60 and insert bit 40 may be received.

In addition to the aforementioned component parts, the top surface 22b further includes a raised rib portion 24 that extends between the front and rear surfaces of the head portion 22 and thus serves as a guide for movement of the clamping member 30.

To this end, the top surface 22b further includes an oval cavity 25 that extends downwardly from the top face 22b for communication with a bore 26, with bore 26 extending rearwardly from the top front face 22a and being counterbored at at least one axial end thereof in the manner set forth in greater detail in applicant's prior U. S. Patent 2,967,345. Tapped apertures 27 and 28 extending downwardly from top face 22b and bottom wall 23a, respectively, complete the structural components of the holder 20.

Considering next the detailed structural characteristics of the clamping member 30, it will be seen from FIGURES 1 and 2 that the same is of generally block-like configuration so as to have opposed top and bottom faces 31a and 31b, with an oval bore 32 communicating between these faces for the purposes of attaching the clamping member 30 with respect to tool holder 20 upon passing a bolt 33 through the same followed by inserting and threading of the same into tapped aperture 27. Aligned movement during such clamped position is facilitated by groove 34 extending transversely of the surface 31b, as best shown in FIGURE 2, with groove 34 receiving the previously described rib 24. Additionally groove 34 is provided with a blind bore 35 for coaction with the adjustment means 70, as will be presently described.

As best indicated in FIGURE 2, the face 31b is offset to provide a planar surface 31c that is disposed in parallelism with the surface 31b, with the just described surface 31c having formed thereon a transverse rib 36 and a protuberance 37; the arrangement being such that the rib 36 is provided at a spaced distance from the deflecting edge 38, while the protuberance 37 is positioned between the rib 36 and the edge 38.

The rib 36 is further provided with a tapped aperture 36a, while an inclined face 38a (FIGURE 1) extends rearwardly and upwardly from the edge 38 for deflection of chips in known manner. In this regard, it will be noted that in the preferred embodiment of the invention disclosed herein, that the projecting face of the rib 36 is shown disposed between the planes of faces 31b and 31c, while the projecting face of the protuberance 37 is similarly shown disposed between the plane of face 31c and the projecting face of rib 36. A shoulder 39, offset as at 39a, interconnects the surfaces 31b and 31c and provides lateral support for the chip breaker element 50, as will be described.

With regard next to the structure of the cutting insert 40, the same is shown in the drawings as preferably being of flat triangular wafer-like configuration so as to permit reception of the same in the pocket 23, with any two triangular side edges thereof being capable of being seated against the walls 23b and 23c of pocket 23, with the remaining edge of the cutting insert projecting beyond the front face 22a to define a cutting edge 100 (FIGURE 1).

In this fashion, six (6) cutting edges are provided and may be selectively used by indexing and reversing of the cutting insert.

Considering next the structure of the chip breaker element 50, it will be seen from FIGURES 1 and 2 of the drawings that the same is of generally quadrilateral wafer-like configuration so as to include top and bottom faces 51 and 52 that interconnect opposed side surfaces 53 and 54. The front and rear surfaces 55 and 56 are both tapered toward the central portion of the member 50 and, in this fashion, the same are reversible with respect to their mounting on the clamping member 30.

To facilitate such mounting, the top face 52 includes a groove 57 that extends between the opposed sides 53 and 54 and which receives the rib 36 as clearly shown in FIGURES 1, 3 and 4 of the drawings with the protuberance 37 also engaging the portion of the top surface 52 that is disposed between the groove 57 and the front edge 55 (see FIGURE 3). Also, and as shown in FIGURE 3, the groove 57 has opposed parallel sidewalls that are disposed substantially at right angles to the top and bottom surfaces for coaction with the parallel surfaces of the rib 36 as shown best in FIGURES 3 through 6.

A countersunk aperture 58 permits passage of a bolt 59 (FIGURES 1 and 2) to releasably secure the chip breaker 50 to the clamping member 30, with side surface or portion 54 thereof abutting shoulder 39 during such engagement. It is to be noted that in the preferred form of the invention illustrated, the bolt 59 is not drawn up completely. This permits the chip breaker 50 to "float" with respect to the clamping member 30.

The remaining component portion to be described relates to the bit support 60 and if the drawings will be observed, it will be noted that the same is of similar outline configuration as the previously described cutting insert 50 so as to have edges 61 and 62 that are received against walls 23c and 23b of pocket 23, with the front edge 61 thereof being spaced slightly inwardly from the cutting edge of the insert 40 as shown in FIGURE 3. A centrally located counterbored aperture 64 permits reception of a screw 65 that has its free end received in tapped aperture 28.

With reference to the adjustment means 70, it should be noted that the adjustment means of applicant's prior U. S. Patent 2,937,432, can be employed and, accordingly, reference is made to this copending application for a more detailed description of the component parts.

In this regard, it suffices to say that a bolt 71 has its head portion disposed in the counterbored portion of bore 26 by snap ring 72 so that no axial shifting of bolt 71 with respect to body 20 will occur during rotation thereof as by placing an Allen wrench in slot 73. A block 74 received in the opening 25 is provided with a threaded bore that is received over the threaded shank of bolt 71, and in this fashion rotation of the bolt 71 will cause the block 74 to move relatively of slot 25. A reduced pin portion 75 projects beyond the face portion 22b for engagement with blind bore 35 of clamping member 30, and in this fashion the clamping member 30 may be shifted toward and from the cutting edge of the insert upon rotation of the bolt 70.

In use or operation of the improved device, it will first be assumed that the component parts have been assembled as shown in FIGURE 1 so that a cutting edge 100 of the insert bit 40 projects beyond the front edge portion 22a for cutting engagement with a rotating work piece.

At this time the member 30 will be disposed in clamping relationship over the insert bit 40 and if FIGURE 3 will be carefully viewed, the following points will be noticed.

First, the protuberance 37 is in contact with the top face 52 of the wear member in the region of front surface 55, while the rear portion of the face 52 is spaced from the surface 31c of clamping member 30. Additionally, the rib 36 is spaced with respect to the bottom portion of the groove 57 and the net result is that the clamping pressure applied by the clamping member 30 on the chip breaker insert 50 is directed substantially in the line of the arrow 101, with a similar clamping pressure being applied to the insert 40 by the chip breaker member 50.

It has previously been described as being important that the force of arrow 101 be preferably forwardly of rib 36 to avoid fracture of the insert 50. It will also be noted that a snug contact between the front portion of insert 50 and insert 40 is obtained at the point indicated by the numeral 102, thus avoiding clogging of chips.

In this regard, it should be further noted that both rearwardly disposed portions of faces 51 and 52 are shown respectively spaced with respect to (1) the surface 31c and (2) the surface 22b, with the spacing just described being exaggerated for illustration purposes.

In this fashion it will be seen that if the insert 40 or bit support 60 is thinner than shown in the drawings that the spaced arrangement just described, together with the floating attachment of the chip breaker insert 50 will, nonetheless, permit the thinner insert 40 to be effectively clamped in position.

At this time a cutting operation may be effectuated and chips cut by cutting edge 100 will be deflected into a spiral by the inclined wear surface 55, with the thrust or force received by the wear surface 55 being absorbed by the connection between the rib 36 and groove 57.

If it is desired to adjust the angle of chip, it is merely necessary that the bolt 33 be slightly backed off, at which time an Allen wrench may be placed in opening 73 and rotated, whereupon the actuating pin 75 will cause shifting of the clamping member 30 and chip breaker insert 50 as a unit relatively of the tool holder 20, the bit support 60 and the cutting insert 40.

It should be noted that this movement can be effectuated either toward or from the cutting edge 100 through an infinite number of possible settings, and further that in some instances it will not be necessary to back off the bolt 33 to effectuate such adjustment.

When it is desired to index or change the cutting insert it follows that the bolt 33 may again be backed off, followed by removal and changing or indexing of the tool, followed by repositioning of the same and tightening of bolt 33.

During such times, the wear surfaces of the chip breaker insert 40 can, if desired, be reversed by merely loosening bolt 59 upon removal of member 30. Similarly, the bit support 60 can, at any time, be changed in like fashion by removal of volt 65 with respect to tapped aperture 28.

It will be seen from the foregoing that there has been provided a new and improved type of chip breaking element that is characterized by the fact that the same effectively supports a replaceable chip breaking insert, while simultaneously supporting the same in floating relationship so as to properly direct the clamping force onto the appropriate portion of the cutting insert.

It will further be seen how the above described connection between the chip breaking insert and the clamping member also provides a maximum support against cutting forces and further how the releasable attachment of the bit supports with respect to the tool holder prevents loss and/or shifting of the bit support during use of the cutting tool.

Figure 5:
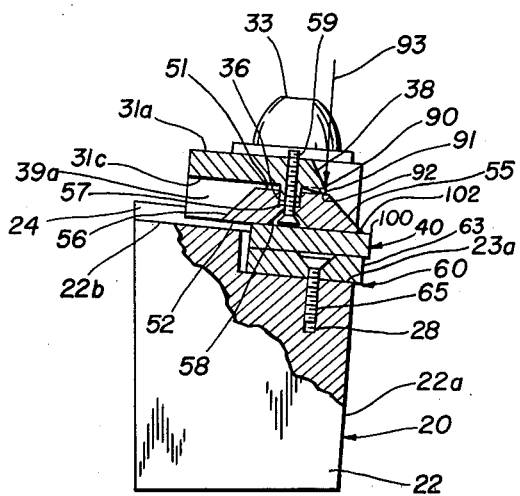
FIGURES 5 and 6 are sectional views of modified forms of the invention.

In the modified form of the invention shown in FIGURE 5, a modified form of protuberance is provided on the clamping face of the clamping member and, accordingly, all other component parts being the same, the same numerals will be used to designate the component parts previously described.

Accordingly, in FIGURE 5, the previously described protuberance 37 is replaced by a tapered projection 90 that extends from the surface 31c to a maximum projection point 91, designed to make contact with the top surface 52 at a point 92. In this fashion all clamping force exerted by member 30 is directed onto insert 50 in the direction of arrow 93.

The use or modification of the FIGURE 5 form of the invention is similar to that previously described.

Figure 6:
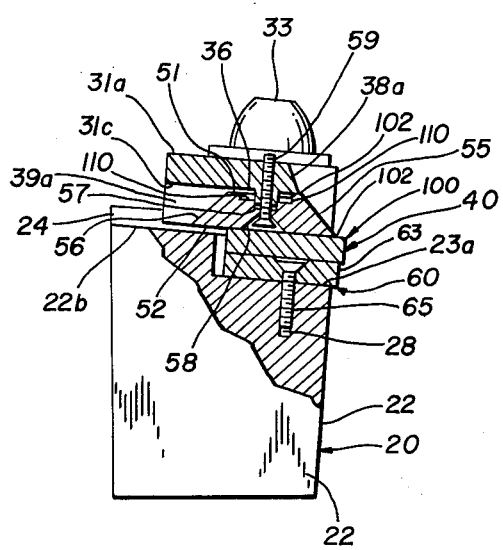

In FIGURE 6 it will be seen that a similar result is obtained by cutting away a portion of the face 52 adjacent its point of intersection with groove 57 so as to define an enlarged groove 110. In this fashion, the area in which bearing contact could occur between clamping member 30 and chip breaker insert 50 is restricted to the extreme front and rear portions as shown in FIGURE 6.

While a full and complete description of the invention has been set forth in accordance with the dictates of the patent statutes, it is to be understood that the invention is not intended to be so limited.

Thus, the rib and groove arrangement shown could be reversed, with the groove being provided on the clamping member and the rib on the chip breaker. Other similar changes could be made.

Accordingly, modifications of the invention, such as relate to changes in sizes and shapes or material, may be resorted to without departing from the spirit hereof or the scope of the appended claims.

This application is a continuation application of the application of Raymond E. Novkov, Serial No. 13,740, filed March 9, 1960, for Adjustable Chip Breaker and now abandoned.

What is claimed is:

1. A cutting tool of the character described, comprising:
   (1) a tool holder having
      (a) front and top surfaces that are undercut to define a tool pocket opening into said surfaces;
   (2) a tool bit received in said pocket and having
      (a) a cutting edge projecting beyond the front surface of said body;
   (3) a clamping member releasably secured to said body and
      (a) having a bottom surface overlying said top surface of said body and
      (b) a front edge that overlies said bit adjacent the projecting portion thereof;
   (4) a chip breaker;
   (5) mating rib and groove means
      (a) interconnecting said clamping member and said chip breaker and
      (b) extending transversely theerof in substantial parallelism to said front edge portions thereof, whereby
         (1) cutting forces applied normal to said front edge portions will be absorbed by said interconnected rib and groove means;
   (6) a protuberance projecting from said bottom surface of said clamping member adjacent said front edge,
      (a) with said protuberance engaging said chip breaker; and
   (7) means carried by said holder for moving said clamping member and said chip breaker relatively of said holder and said tool bit.

2. The device of claim 1 further characterized by the fact that said protuberance prevents said rib from fully seating in said groove, whereby clamping pressure is applied through said protuberance.

3. A cutting tool of the character described, comprising:
   (1) a tool holder
      (a) having front and top surfaces that are undercut to define a tool pocket opening into said surfaces;
   (2) a tool bit
      (a) received in said pocket and
      (b) having a cutting edge projecting beyond the front surface of said body;
   (3) a clamping member
      (a) releasably secured to said body and
      (b) having a bottom surface overlying said top surface of said body and
      (c) a front edge that overlies said bit adjacent the projecting portion thereof;
   (4) said bottom surface having a transverse projecting rib disposed in substantial parallelism with said front edge thereof;
   (5) a chip breaker element of flat quadrilateral configuration having
      (a) parallel top and bottom surfaces and further having
      (b) opposed parallel chip breaking edges that are inclined toward a top planar surface;
   (6) said top planar surface having a transverse groove disposed substantially midway between said chip breaking edges in parallelism therewith;
      (a) said bottom planar surface having an opening that opens into the bottom portion of said groove substantially medianally of its length
      (b) whereby said chip breaker is reversibly secured to said clamping member upon interconnection of said rib and groove;
   (7) said chip breaker
      (a) having its bottom surface engaged with said tool bit and
      (b) further having one said chip breaking edge disposed adjacent said cutting edge of said tool bit upon interconnection of said clamping member with said holder and said chip breaker;
   (8) means for concentrating the clamping force exerted on said chip breaker in the portion thereof adjacent said cutting edge of said tool bit when the same is positioned between said clamping member and said tool bit, whereby
      (a) said chip breaker exerts clamping pressure on said tool bit adjacent the cutting edge thereof; and
   (9) means carried by said holder for moving said clamping member and said chip breaker relatively of said holder and said tool bit.

4. The device of claim 2 further characterized by the fact that said transverse groove and said rib both include opposed parallel walls that are disposed substantially perpendicular to said top and bottom surfaces of said chip breaker insert; said walls being engaged whereby shifting of said chip breaker edge towards and from said rib is obviated.

5. A reversible chip breaker insert of the character described, comprising:
   (1) a body section,
      (a) of flat quadrilateral configuration,
      (b) having parallel top and bottom planar surfaces,
      (c) having opposed chip breaking edges
         (1) that are parallel and
         (2) that are complementally inclined from a point of juncture with said bottom surface to a point of juncture with said top surface,
      (d) said top surface having a groove
         (1) whose longitudinal dimension extends transversely thereacross in parallelism with the point of juncture between said top surface and said chip breaking edges,
         (2) that is disposed substantially midway between said opposed chip breaking edges,
         (3) whose opposed walls are substantially perpendicular to said top and bottom surfaces,
         (4) whose width is less than the width of said top surface,
      (e) said bottom surface
         (1) having an opening (a) that opens into said groove at a point
   (1) medianally between the opposed walls of said groove,
   (2) medianally between the opposed ends of said groove,
(b) and that is countersunk with respect to said bottom planar surface of said body.

References Cited in the file of this patent

UNITED STATES PATENTS 2,799,079   Brigner _____ July 16, 1957

FOREIGN PATENTS 989,307     France _____ May 23, 1951
1,002,587   Germany _____ Feb. 14, 1957